United States Patent
Askeland et al.

(10) Patent No.: US 6,185,002 B1
(45) Date of Patent: Feb. 6, 2001

(54) REDUCTION OF PERIODIC ARTIFACTS IN INCREMENTAL PRINTING, THROUGH USE OF ASYMMETRIC RANDOMIZED SUPERPIXELS

(75) Inventors: Ronald A. Askeland; Amir Doron, both of San Diego, CA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/042,880

(22) Filed: Mar. 16, 1998

(51) Int. Cl.[7] .............................. B41B 15/00; B41J 15/00; H04N 1/40
(52) U.S. Cl. .......................... 358/1.8; 358/1.1; 358/1.18; 358/456; 358/466; 358/526; 358/1.9
(58) Field of Search .......................... 358/1.1, 1.9, 1.18, 358/526, 456, 466

(56) References Cited

U.S. PATENT DOCUMENTS 5,563,985 * 10/1996 Klassen et al. ........................ 358/1.1

* cited by examiner

Primary Examiner—Edward L. Coles
Assistant Examiner—Twyler Lamb

(57) ABSTRACT

Periodic inking artifacts are reduced by randomness introduced into an image-processing stage. This goes beyond providing a fixed pattern earlier derived through random processing; rather the system literally introduces randomness or at least pseudorandomness into the image-processing stage. Preferably a superpixel is selected, essentially at random, from a plurality of superpixels—at least for points with an intermediate tonal level, which is the part of the tonal range where dot-placement error is most conspicuous. If image scaling or some other reason for using superpixels (and starting with a coarse grid) is not present, the randomness-introduction approach preferably includes preparing the image using a pixel grid that is coarser than the available printer resolution. The selected superpixel is applied at the coarser grid to define a set of individual pixels at printer resolution. A major preference relates to printing in sequential printing passes: a printmasking stage, downstream and distinct from the image-processing stage, is used to establish temporal assignments of inking into the plural passes. Because most or many printing systems already employ superpixels anyway for various purposes, the simple tactic of selecting superpixels randomly achieves major gains in artifact reduction but adds little complexity, apparatus, processing time or cost.

20 Claims, 6 Drawing Sheets

REDUCTION OF PERIODIC ARTIFACTS IN INCREMENTAL PRINTING, THROUGH USE OF ASYMMETRIC RANDOMIZED SUPERPIXELS

RELATED PATENT DOCUMENTS

Closely related documents are other, coowned U.S. utility-patent documents filed in the United States Patent and Trademark Office—and also hereby incorporated by reference in their entirety into this document. One is utility-patent application Ser. No. 08/957,853, in the names of Doron, Askeland and Chang, and entitled "Method of Generating Randomized Masks to Improve Image Quality on a Printing Medium". Another such document is Ser. No. 08/960,766, in the names of Chang and Bockman, and entitled "Random Printmasks in a Multilevel Inkjet Printer". Still others are Ser. No. 08/810,053, in the names of Serra and Moroney, entitled "Multipass Inkjet Printmodes with Randomized Dot Placement, to Minimize Patterning and Liquid Loading"; Ser. No. 08/810,753, in the name of Serra, entitled "Multipass Color Printmasks Based on Location Rules To Minimize Hue Shift, Banding and Coalescence"; and Ser. No. 08/558,560, in the names of Perumal and Lin, entitled "Halftone Dither Cell with Integrated Preferred Color Matching", and U.S. Pat. No. 5,485,180, in the names of Askeland, Hunt, Prasad, Hall, Hickman, Cleveland, and Allen, and entitled "Inking for Color-inkjet Printers, Using Nonintegral Drop Averages, Media-varying Inking, or More than Two Drops per Pixel"—and documents cited therein.

FIELD OF THE INVENTION

This invention relates generally to machines and procedures for incremental printing of text or graphics on printing media such as paper, transparency stock, or other glossy media; and most particularly to a scanning thermal-inkjet machine and method that construct images from individual ink spots created on a printing medium, in a two-dimensional pixel array. The invention is also believed applicable to sister technologies such as the hot wax transfer method. The invention employs image-processing—as distinguished from printmode—techniques to optimize image quality, but can be used in conjunction with downstream printmode strategies including random and pseudorandom printmasks.

BACKGROUND OF THE INVENTION

A basic goal for these machines is very high quality in printed images, using a relatively inexpensive printer. This goal is implemented by the devices described below, but at the same time has been obstructed by certain characteristics—also described below—of these same devices.

Incremental printing nowadays is generally accomplished through digital manipulation of image data in one or another type of electronic digital microprocessor. All such manipulation, including the stages discussed below under the conventional designations of "image processing" and "printmasking", can be performed in a host computer, e. g. in software that operates an attached printer, or can be built into the printer—but most commonly is shared between the two.

For operations performed within the printer, as is now well known, the printer may contain either a general-purpose digital processor running programs called "firmware", or an application-specific integrated circuit (ASIC) manufactured to perform only specific functions of particular printers. In some cases the printer may use both a firmware subsystem and an ASIC.

Image processing—The fundamental task of all these devices is receiving data representing a desired image and developing from those data specific moment-by-moment commands to a printing mechanism. This task, for purposes of the present document, will be called "image processing".

Such processing typically includes, at the outset, some form of darkness and contrast control or adjustment. In a color printer, this preprocessing stage analogously also includes color conversions and any needed color corrections. Such preprocessing can handle both user-desired color modification and any known mismatch between an input-image color specification and the operating color space and gamut of the printer.

Next downstream from contrast, darkness and color corrections—and particularly important for images other than text—image processing also includes rendering or rendition techniques (such as dithering of error diffusion). A rendition stage has two principal functions, both directed to making spatial assignments of color ink spots to particular pixels.

First, it attempts to implement the relatively continuous or very fine tonal gradations of a photograph-like image, in terms of the relatively limited number of gradations which a typical inexpensive printer can produce. A digital file in a computer ordinarily is able to represent fine tonal gradations quite accurately, since data formats—although digital—usually allow for at least 256 distinct tonal levels between, for instance, pure white and dead black.

Second, in a color printer, rendition also attempts analogously to implement the relatively huge number of colors which a computer can invoke. Rendition must accomplish this in terms of the relatively limited number of colors which a typical inexpensive printer can produce.

Banding—An obstacle to highest-quality printing is caused by repeating failure of particular elements of the print mechanisms to mark properly—or consistently with other elements. Periodic artifacts arise from constant or repeating errors of inkjet trajectory, pen positioning and speed, and printing-medium positioning and speed.

For instance malfunction or misalignment of a particular inking nozzle or the like can leave a generally consistent white or light pixel row across every image region where that particular element (e. g. nozzle) is supposed to mark. In the case of misalignment, the same problem also produces excess inking across some nearby region where the same element should not be marking.

Image regions are not all equally affected by such defects. The magnitude of banding problems, or more generally dot-placement errors, varies with the tonal level or in other words dot density within an image.

We can define three regions of a tonal ramp, based on the amount of white space:

(1) highlights: These areas have ample white space and to the naked eye exhibit little in the way of banding or other dot-placement artifacts. Such artifacts are of course present, but hard to see—because small differences in dot position can represent only a relatively small fractional change (or none) in the large amount of white space that is seen. Furthermore, because the dots that are present are so far apart, and usually irregularly located, they fail to form a visual frame of reference within which a person can detect placement errors directly.

(2) midtones: These parts of the tonal range are most sensitive to banding because they have small amounts of white space. Dot-placement errors are highly visible because small differences in dot position can have a large effect on how much white space is visible. Coalescence contributes further to the conspicuousness of banding and graininess because dots clump together.

(3) saturated areas: These segments of the tonal range have almost no white space showing through. The large amount of colorant on the printing medium hides dot placement errors—with the exception of print-medium advance problems. Interactions between the colorant and the printing medium, however, can lead to flood banding and coalescence.

As a practical matter, the boundaries of these tonal-range segments depend in part upon the nature of the image being printed, as well as the exact character of the dot-placement errors produced by a particular printhead. Therefore these regions of the tonal ramp can be defined neither sharply nor generally.

For a rule of thumb, however, for purposes of placement-error visibility the midtone region has very roughly more than one single printed dot per four pixels—but, at the saturated end of the range, very roughly more than one single dot subtracted from full coverage, per four pixels. For example in a four-level (including zero) system, since the maximum number of dots in each pixel is three, the maximum inking in four pixels is 3×4=12 and the upper limit of the midtone region is 12−1=11 dots per four pixels.

In other words, the high-visibility range lies above approximately twenty-five percent coverage in single dots, but below approximately twenty-five percent in single dots deducted from the maximum possible inking level. Again, in practice the range defines itself in a functional way and not exactly in numerical terms.

Inking and coalescence—To achieve good tonal gradations and (for color printers) vivid colors, and to substantially fill the white space between addressable pixel locations, ample quantities of colorant must be deposited. Doing so, however, generally requires subsequent removal of the water or other base—for instance by evaporation and, for some print media, absorption—and this drying step can be unduly time consuming.

In addition, if a large amount of colorant is put down all at substantially the same time, within each section of an image, related adverse bulk-colorant effects arise. These include so-called "bleed" of one color into another (particularly noticeable at color boundaries that should be sharp), "cockle" or puckering of the printing medium, and even "blocking" or offset of colorant in one printed image onto the back of an adjacent sheet. In extreme cases such blocking can cause sticking of the two sheets together, or of one sheet to pieces of the printer apparatus.

All these conditions of course—like the banding problem discussed in the preceding subsection—defeat the objective of providing the highest practicable quality of printing in a relatively economical printer. Earlier efforts in this field, however, have attempted to address these obstacles.

Printmodes—One useful known technique for dealing with both the above-described problems is laying down in each pass of a printhead only a fraction of the total colorant required in each section of the image. Any areas left white or light in each pass tend to be filled in during one or more later passes.

These techniques, known as "printmodes", not only tend to control bleed, blocking and cockle by reducing the amount of colorant that is deposited on the page essentially at once, but also help greatly to conceal banding effects. Most preferably the several printing passes are overlapping, so that each swath of colorant tends to hide the kinds of banding due to periodic errors in printing-medium advance mechanisms.

For instance, even blank space between the edges of two inaccurately abutting swaths are usually covered by at least some colorant that is well within the boundaries of at least one other swath. Depending on the total number of passes, such blanks may be covered by as many as e. g. three other swaths—in a four-pass printmode—or even more. To put it another way, only one in four drops is missing along such a "blank" pixel row, and the nonuniformity is far less noticeable.

The specific partial-inking pattern employed in each pass is called a "printmask". The way in which these different patterns or masks add up to a single fully inked image is the "printmode".

Whereas the image-processing stage establishes spatial assignments of color spots to pixels, the printmasking stage establishes temporal assignments of color spots as among the several printing passes that have access to each pixel. Printmasking is ordinarily downstream from image processing.

Random masking—Although printmode techniques are very powerful, it has been noticed that they fail to fully eliminate the effects of the previously described underlying periodic errors, and in some cases may even contribute to certain kinds of periodic artifacts. Because of this, considerable very recent attention has been directed to randomization of the printmasking stage. Some such efforts are reflected in the previously enumerated patent documents relating to randomized masks, modes and location rules.

The improvement available through randomization, unfortunately, is limited because printmasks are effective in hiding dot-placement errors only within the dimensions of the mask. Therefore a maximal improvement requires that the printmask patterns be large in comparison with the overall image—for instance, a pattern width equal to one-third or more than one-half of the image width.

Designing printers that can store and use large printmasks, however, is difficult and expensive. Most efforts have therefore focused upon printmasks no wider than sixteen or thirty-two pixels, and such widths are typically only a very small fraction of a full image width.

Such printmasks therefore are necessarily replicated across the image—with like considerations for the vertical dimensions leading to a similar replication down the image. The result is a repeating pattern (FIG. 2) that is all too easily seen in the midtones.

The illustration was made with an eight-by-eight pixel mask used to print an area fill that has one dot in each of four pixels—i. e., four dots total. This "level four" tone is well within the midtone range extending very roughly from two to twenty-seven single dots in each four pixels.

As this example demonstrates, development of new and better printmasks is likely to be only a partial solution to banding and other repeating artifacts in the midtones. (It will later be seen that the pattern of FIG. 2 actually corresponds to using a certain variant of our invention, but one in which no improvement is produced for the level-four tone.)

Superpixels and dither cells for image processing—Pixel structures called "superpixels" (see examples at right in FIGS. 1 and 3) have previously been used in the early image-processing stages for various purposes. These have included establishment of effectively nonintegral numbers of drops per pixel (as in the Askeland et al. document mentioned earlier), production of vivid colors (as in the Perumal and Lin patent document and references cited therein), and scaling of images.

Image scaling refers to a preparatory process needed for printing a physically large image from an image-data block that is small in terms of numbers of pixels. In such cases it is necessary to somehow expand the small data block to provide the numbers of pixels needed for the desired large image.

Merely cloning pixel rows and columns would yield an image that could appear satisfactory from a distance but would look very coarse when viewed at close range. For good image quality under those circumstances some form of interpolation is needed, and superpixels have been used to provide it.

For all these purposes, generally speaking a relatively low-resolution original image data array is used to call up a particular superpixel pattern—which then provides sufficient pixel information for an image with some multiple of the original resolution. If the image is to be expanded further, it may be subjected to iteration of the same procedure; alternatively, the superpixel structure adopted initially may encompass a greater number of individual pixels. Superpixels may be either symmetrical or not.

In all of these uses of superpixels, the superpixel selection for each situation is repetitive and consistent, not random. The same is true of dither cells, popularly used in the rendition stage to produce a random appearance, even including the dither cells taught in the above-mentioned patent document of Perumal & Lin. Their cells, like random printmasks, are randomly or pseudorandomly derived, but once derived are used repetitively.

Conclusion—Repetitive patterns arising from systematic dot-placement errors, even in the presence of internally randomized printmask patterns, have continued to impede achievement of uniformly excellent inkjet printing—at high throughput—on all industrially important printing media. Awkwardness of overprinting fine detail in black is another adverse limitation. Thus important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is apparatus for printing desired images on a printing medium, by construction from individual marks formed in pixel arrays on a printing medium. The apparatus includes an image-processing stage for establishing spatial assignments of inking into pixels.

It also includes some means for reducing periodic inking artifacts. For purposes of generality and breadth in discussing the invention, we shall refer to these means as the "artifact-reducing means" or simply the "reducing means".

These reducing means in turn include some means for introducing randomness in the image-processing stage. Again for breadth and generality we shall call these the "randomness-introducing means" or just the "introducing means".

Our randomness-introducing means go beyond merely providing a fixed pattern that was at some earlier time derived through random processing—as in the recent efforts discussed above. Rather, the introducing means operate to introduce randomness literally into the image-processing stage.

In addition the apparatus includes a printing stage. This stage is for applying signals from the image-processing stage to control forming of the marks on such medium.

The foregoing may constitute a description or definition of the first facet of the invention in its broadest or most general form. Even in this general form, however, it can be seen that this aspect of the invention significantly mitigates the difficulties left unresolved in the art.

In particular, this aspect of our invention introduces an entirely new way to suppress and hide banding and other repetitive artifacts. It does so by essentially scrubbing away part of the underlying repetitive regularity through actual random steps in the image-processing stage.

Although this aspect of the invention in its broad form thus represents a significant advance in the art, it is preferably practiced in conjunction with certain other features or characteristics that further enhance enjoyment of overall benefits.

For example, it is preferred that the randomness-introducing means comprise means for selecting a superpixel, substantially at random, from among a plurality of superpixels usable at least at certain points in the image. In this case a further preference is that the image-processing stage include some means for receiving desired tonal levels for all points in the image, and also that the superpixel-selecting means include some means for selecting a superpixel at least for those certain points that are associated with an intermediate tonal level.

Still further in the same series of related preferences, we prefer that the printing stage include some means defining an output resolution and marking means capable of multiple tonal values. Here the randomness-introducing means further preferably include some means for predefining, for at least each inking level in a midrange of tonal values, a plurality of multipixel patterns at the printer resolution, for use as the plurality of superpixels.

Another preference is that the randomness-introducing means further include some means for preparing the image using a pixel grid that is coarser than the available printer resolution. In this case it is also desirable to include, within the introducing means, some means for selecting, for each point in the coarser grid, one respective pixel pattern from the plurality of patterns.

A major preference in practice of our invention relates to practice of the invention for use in forming the pixel arrays in sequential printing passes. We refer to this form of the invention as a preference because the invention as defined to this point can be used for single-pass printing. (As will be discussed further in the Detailed Description section, a sort of consolidated spatial-and temporal-assignment system can be employed in single-pass operation.)

Where multipass printing is in use, the invention preferably also includes a printmasking stage, which receives signals from and is distinct from the image-processing stage-and in response (to those signals) establishes temporal assignments of inking into the plural printing passes. Where printmasking is in use, the reducing means include some means for reducing such artifacts that are associated with repetitively used printmasking patterns; and the printing stage applies the new signals from the printmasking stage to control the mark forming.

The several preferences described above for the general case (either single—or multipass printing) are applicable as well to the preferable form of the invention with printmasking.

In preferred forms of a second of its facets or aspects (as with the first), our invention is apparatus for printing desired images on a printing medium, by construction from individual marks formed in pixel arrays. The apparatus includes an image-processing stage for establishing spatial assignments of inking into pixels.

It also includes some means for establishing multiple selectable superpixels for use in the image-processing stage. For reasons suggested earlier, we shall refer to these means as the "superpixel-establishing means", or simply "establishing means". In addition, the apparatus includes some means for substantially randomly selecting superpixels, from among said multiple selectable superpixels, for use in the pixel array.

The foregoing may constitute a description or definition of the second facet of the invention in its broadest or most general form. Even in this general form, however, it can be seen that this aspect of the invention, too, significantly mitigates the difficulties left unresolved in the art.

In particular, random selection of superpixels in the image-processing stage is a particularly beneficial technique because—as noted in the Background section of this document—most or many printing systems already employ superpixels anyway for various purposes. Thus the simple tactic of selecting such superpixels randomly can achieve major gains in artifact reduction while adding very little in terms of complexity, apparatus, processing time or cost.

Although this second aspect of the invention in its broad form thus represents a significant advance in the art, it is preferably practiced in conjunction with certain other features or characteristics that further enhance enjoyment of overall benefits.

For example, it is preferred that the apparatus also include a printmasking stage, which follows and is distinct from the image-processing stage. The printmasking stage is for establishing temporal assignments of said inking into plural printing passes.

In preferred embodiments of a third of its basic aspects or facets, the invention is a method of printing desired images on a printing medium. This method uses a printer that has a printer resolution and is capable of multiple tonal values, and that operates by construction from individual marks formed in pixel arrays in multiple inking passes.

The method includes the step of predefining, for at least each inking level in a midrange of the tonal values, a plurality of multipixel patterns at the printer resolution. It also includes the step of preparing the image using a pixel grid that is coarser than the available printer resolution.

Another step is selecting—for each point in the coarser grid—one respective pixel pattern from the plurality of patterns. Still other steps include rendering the image using the selected printer-resolution pixel patterns at each point in the coarser grid, and then applying at least one printmask to allocate pixels of the rendered image as among the multiple printer passes.

The foregoing may represent a definition or description of the third aspect of our invention in its most general or broad form. Even as so couched, it can be seen that the invention in this form importantly advances the art.

In particular, selective use of one pixel pattern from a group of such patterns—for use in the rendition stage—introduces an element of variability into image processing that can be extremely useful in reducing repetitive artifacts.

Nevertheless we prefer to practice the invention with certain other features or characteristics that optimize the benefits of the invention. In particular we prefer that the selecting step include selecting the one pattern from the plurality of patterns substantially at random.

If that preference is observed, then we also consider it preferable that the random-selecting step include selecting at random only among certain of the plurality of patterns that is asymmetric. An alternative form of the invention, however, encompasses selecting at random among at least certain of the plurality of patterns that are initially either symmetric or asymmetric.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

1. Superpixel Patterns

Figure 1:
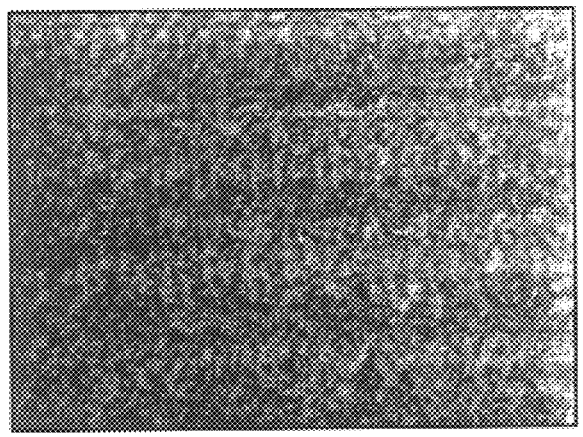
FIG. 1 is at left a black-and-white photomicrograph of a color square printed using an eight-by-eight pixel print mask, with asymmetric superpixels selected at random between the two patterns shown at right, according to preferred embodiments of the invention (the micrograph being reproduced at very high contrast, for better artifact discrimination)
Figure 2:
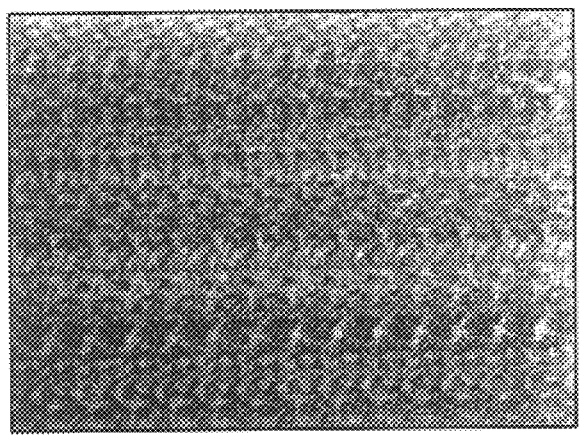
FIG. 2 is at left a like micrograph but of a color square printed with just one single symmetrical superpixel pattern as shown at right (an ineffective form of the invention, for the particular portion of the tonal range involved)
Figure 3:
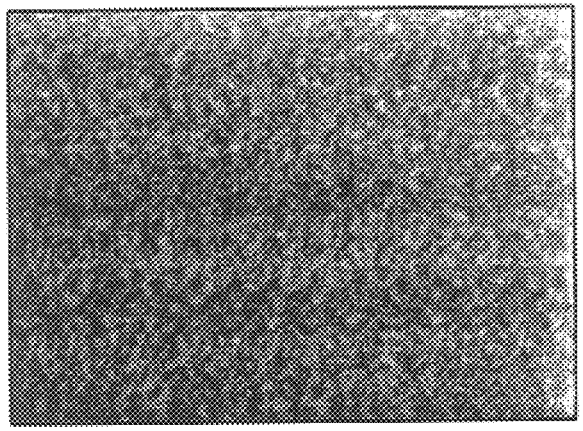
FIG. 3 is at left a like micrograph but with superpixels selected at random between four (rather than only two) patterns as shown at right, according to preferred embodiments of the invention.

Some representative superpixel sets for use with our invention appear in Table 1, and FIGS. 1 through 3 show results at level 4 (four single dots or equivalent, distributed among four pixels). Comparison of the coded values in the tabulation with the diagrams in the illustrations will reveal how the codes work.

Specifically, in each four-digit code the first digit represents the upper left-hand pixel in a four-pixel superpixel; the second number represents the upper right. The third number represents the lower left-hand pixel, and the fourth number the lower right.

For example the superpixels for level 4 in set A, "2002, 0220" in the table, are illustrated at right in FIG. 1—showing that 2002 means two dots in upper left

TABLE three exemplary superpixel sets

| level | superpixel set A | B | C |
|---|---|---|---|
| 0 | 0000 | 0000 | 0000 |
| 1 | 1000, 0100, 0010, 0001 | 1000, 0100, 0010, 0001 | 1000, 0100, 0010, 0001 |
| 2 | 1001, 0110 | 1001, 0110 | 1001, 0110 |
| 3 | 2001, 1002, 0120, 0210 | 0111, 1011, 1101, 1110 | 0111, 1011, 1101, 1110 |
| 4 | 2002, 0220 | 1111 | 2110, 0112, 1201, 1021 |
| 5 | 3002, 2003, 0320, 0230 | 2111, 1211, 1121, 1112 | 2012, 2102, 1220, 0221 |
| 6 | 3003, 0330 | 2112, 1221 | 0222, 2022, 2202, 2220 |
| 7 | 4003, 3004, 0430, 0340 | 1222, 2122, 2212, 2221 | 1222, 2122, 2212, 2221 |
| 8 | 4004, 0440 | 2222 | 3113, 1331 |
| 9 | 4024, 4204, 0442, 2440 | 3222, 2322, 2232, 2223 | 1333, 3133, 3313, 3331 |
| 10 | 4224, 2442 | 3223, 2332 | 4224, 2442 |
| 11 | 3443, 4334 | 3443, 4334 | 3443, 4334 |
| 12 | 5444, 4544, 4454, 4445 | 5444, 4544, 4454, 4445 | 5444, 4544, 4454, 4445 |
| 13 | 5555 | 5555 | 5555 |
| 14 | 6666 | 6666 | 6666 |
| 15 | 7777 | 7777 | 7777 | and two in lower right, and 0220 corresponds to two dots in upper right and two in lower left.

For levels zero through two, and eleven through fifteen as well, all three sets are the same. Only for levels three through ten do the superpixels patterns of the three sets diverge. Therefore the particular sets shown can produce different results only for those levels three through ten.

Furthermore none of the three sets shown can introduce any variation in output image for the relatively dark portions of the tonal range—namely, at levels thirteen and beyond, where only one superpixel pattern is available (in these sets). As noted previously, however, in the very low and very high ends of the range a human viewer is insensitive to systematic dot-placement errors. Thus, with the illustrated sets, variation is available in image regions that correspond fairly well to the regions where help is needed in suppressing artifacts.

In print regions where the total number of drops in each superpixel is smaller than four, these three sets have effective (and as already noted identical) band-hiding properties. Where the number of drops per pixel is four or more, set B is relatively ineffective because the randomization process has greatest visual impact when at least one of the four individual pixels has zero value.

(As noted in the Background section of this document, set B is completely ineffective at level four. It can now be seen that no variation whatever is available in set B at that level. The same is true at level eight.)

As the illustrations demonstrate, where more than one superpixel pattern is available our invention can generate a extremely striking difference in output image appearance. The degree of image improvement shown, based on the modest program we have conducted to-date, is commercially important.

The superpixel sets illustrated, however, by no means exhaust all possibilities. In particular it is possible to form additional sets simply by combining some or all of the sets shown, or incorporating particular entries from some of the sets into other sets.

The earliest phase of our work focused upon superpixels which are inherently asymmetric, such as the 2110 structure (FIG. 3)—which has symmetry only about the diagonal running from upper left to lower right—and the 2002 structure which is symmetrical about either diagonal. Our idea was that, since it was necessary to have an asymmetric superpixel anyway, we could take advantage of that condition to rotate the asymmetry into other orientations.

It occurred to us that there was no need to limit ourselves to such asymmetric cases, since any midtone symmetric superpixel (such as the 1111 structure in FIG. 2) is readily modified to form an asymmetric superpixel with the same tonal value. Thus for example moving one dot from any pixel position in the 1111 structure to any other position produces one of the asymmetric forms in FIG. 3.

Such thinking led us to the patterns seen in the Table presented above. Exploration of just these simple shifts has proven that the invention provides fertile ground for reduction of repetitive artifacts.

Reinspection of that foregoing Table, however, will reveal several other available substitutions, such as in set B at level eight revising the 2222 pattern by moving just one dot to form a 3 and a 1, in addition to the remaining two 2s. These result in 3221, 2312, 2132, 1223—in all of which the 3 and 1 are opposed across the diagonal—as well as 3122, 1322, 2231, 2213, 3212, 1232, 2321 and 2123 in which the 3 and 1 are instead adjacent.

Many other patterns of higher order (not all useful) can be introduced by allowing movement of more than one dot, to yield structures such as, for example, 1070, 0062, 2510, 3041, 2024, 1034, 3311, 0233 and so forth. It will be immediately evident to those skilled in the art that certain of these patterns are unacceptable—in one or another printing system—for instance because of inking limitations associated with the number of passes in use, or other reasons.

Those cases, however, are readily identified and removed from the set for the particular printing system affected. Some of the higher-order patterns have extreme skew and may thereby produce particular artifact-disrupting effects that are valuable.

On the other hand, some may have undesirable side effects; for instance we have noted that a pattern such as 4000 is good for reduction of banding but bad in that it generates conspicuous graininess in a light field. Thus with regard to strong asymmetries it is easy to "overdo it". We have also noted that diagonal patterns such as 2002 and 0220 are better for banding reduction than horizontal- or vertical-adjacency patterns such as 0022 or 0202.

Useful options are available not only in the inherently symmetric level-four case, but also in higher and lower levels. Level two, for instance, may include superpixels such as 0020; level six may include patterns such as 0600 (since level six is relatively dark anyway, the single heavily inked pixel may not create objectionable graininess) or 0150, and so on.

Workers skilled in this field will now appreciate that with entirely straightforward further development of superpixel sets the invention is capable of even more-important image improvement at all tonal levels of interest. Systematic experimentation with a greater number of such possible sets, noting the visual effects resulting from them, will help to further optimize overall results.

Even without exploring any such added combinations, the difference in image quality between FIG. 1 or 3 and FIG. 2 is dramatic. The nearly negligible added hardware and processing time required to achieve improvement makes this improvement particularly notable.

2. Random Selection of Superpixel Structures

The image-processing stage offers an excellent opportunity to introduce our randomly selected superpixel structures into the overall data-manipulation stream, because in many systems superpixels are either already in use or can readily be incorporated with little or no net disruption of either processing or image quality. In particular, as mentioned earlier, superpixels are used to provide image scaling or nonintegral drop averages.

In any such cases, it is merely necessary to replace each already-present single superpixel with a superpixel drawn at random from a set, wherever more than one tonally equivalent superpel is available. This requires only storing the small amount of data (see Table) for the plural-superpixel sets, and setting up the random-selection process to pick a particular individual superpixel for use at each point. Negligible storage and processing overhead is associated with such substitution.

In other cases, where no superpixel is already in use, we nevertheless can use our invention in a two-step strategy. First, the processing pipeline, firmware or software generates image data at a coarser resolution than needed in the final printing stage.

Second, a separate filter (or if preferred the same pipeline, firmware or software) modifies that coarser-resolution data in such a way as to produce data at the final-printing resolution. In this latter step, the filter (or other module) simply selects a superpixel having an overall number of cells appropriate to the final resolution—but does not always select the same such filter.

Rather it uses this now-artificially-created opportunity to introduce the random selection process, selecting from a set of superpixels which all have that appropriate cell structure. As an example of both steps, in a printer operating at 24 dots per millimeter (600 dots per inch or dpi), first the image-processing stage generates 12 dot/mm (300 dpi) level data as for instance by interpolation or simply arbitrary selection; then each 12 dot/mm level is used to select—but select at random—a superpixel of four 24 dot/mm levels.

Dither cells, though typically much larger than superpixel cells and therefore requiring more storage, offer another opportunity for random selection. Plural cells can be stored, and a specific cell chosen randomly for use in place of the customary single dither cell.

3. Plural-Pass Systems

After image-processing steps have established the spatial distribution of dots to be printed, for a particular image, ordinarily the array proceeds to the later printmasking stage for temporal distribution of the same dots among two or more passes. For highest image quality, relatively larger numbers of passes are usually needed and the printmodes are more properly called "multipass".

Classically a different printmask is formulated for each pass, so that each mask is used in just one respective pass (though a mask may be shifted by one or another form of mask "rotation" for reuse in other passes). The printmask for each pass is accordingly a grid containing single-bit binary values that indicate, for that one pass, whether each particular pixel can be printed or not.

Variant multipass systems employ instead a so-called "shingle mask"—which has a pattern that serves a sort of common or hybrid function, operating as both a dither mask (or superpixel) and printmask. Rather than only single-bit binary values in a separate grid for each pass, a shingle-mask grid contains numbers indicating the pass in which each pixel is printed.

Our invention works well with either of these arrangements—binary-grid masks or shingle masks. Either may be randomized, and our invention is particularly advantageous with plural-pass systems in which the printmask or masks have been randomized.

This is so because a randomized mask introduces an element of irregular patterning into the temporal distributions. The randomized mask and our randomly selected superpixels then cooperate to provide a double disruption of artifacts due to repetitive dot-placement error.

For instance in a 50-by-25 dot/mm (1200-by-600 dpi) system using two-unit superpixels, at tonal level one a single dot can be shifted into either of two positions (which may be described as "01" and "10"). At level two there are three possibilities ("11", "20" and "02").

The printmasking then varies the sequence of printing for each of these dots. This variation produces a variety of inking effects, because using a different printing pass—to print a given dot in a given pixel—fires a different nozzle.

When a particular nozzle happens to be producing a dot-placement error, but a given dot in a given pixel is formed sometimes with that particular nozzle and sometimes with a different nozzle, the error is less repetitive. The visible artifact is therefore less conspicuous and may be eliminated.

4. Single-Pass Systems

In this type of system a variant of the shingle mask is used, but without the numerical values. As in the multipass case, such a mask identifies the positions at which dots will be printed, and also intrinsically identifies the pass—since there is in fact only one pass.

Our invention is usable with such a shingle mask, or more generally in a single-pass system. Overall effectiveness in reducing repetitive artifacts is somewhat lower than in a plural-pass or multipass system.

The reason is that there is only one opportunity—namely, in the image-processing stage—to introduce variation, rather than two opportunities. There is no choice of passes in which to lay down the unit dots of the chosen pattern.

Nevertheless the present invention can yield a worthwhile improvement in image quality, even in the one-pass environment. Normally single-pass operation is provided for utility purposes such as quickly producing a draft printout of an image. Hence even a minor quality improvement can be valuable if it does not noticeably slow down the process. Only as an example, such improvement may take the form of tending to conceal satellites of inkdrops or other relatively coarse defects.

For instance in a 100-by-25 dot/mm (2400-by-600 dpi) system, at level one, the single dot can be shifted into any of four positions. This minor amount of steering effort produces visible mitigation of repeating artifacts.

5. Randomization

Our invention relies upon randomization techniques that may be conventional, or that may be introduced in the future. These techniques may include, for example, operating a conventional random-number generator in real time during use of the product in the field.

The conventional random-number generator can be of a numerical-series, formulaic type such as described in the technical literature, or for instance may be based upon operation of an asynchronous clock. Such a digital clock may be read directly, or randomization may be based upon intervals established by the clock.

Preferably, however, such a generator instead of operating in real time may be operated in the process of product development. A resulting series of random numbers may be memorized for recall during use of the product in the field.

We have found it satisfactory to give equal probabilistic weights to each of the several superpixels in a set, and it appears that this strategy should yield maximum variation in appearance. It is within the scope of our invention, however, to assign unequal probabilities to the different superpixels—whether or not doing so is more effective in reducing artifacts of certain types or under certain circumstances.

6. Hardware For Implementing The Invention

Figure 4:
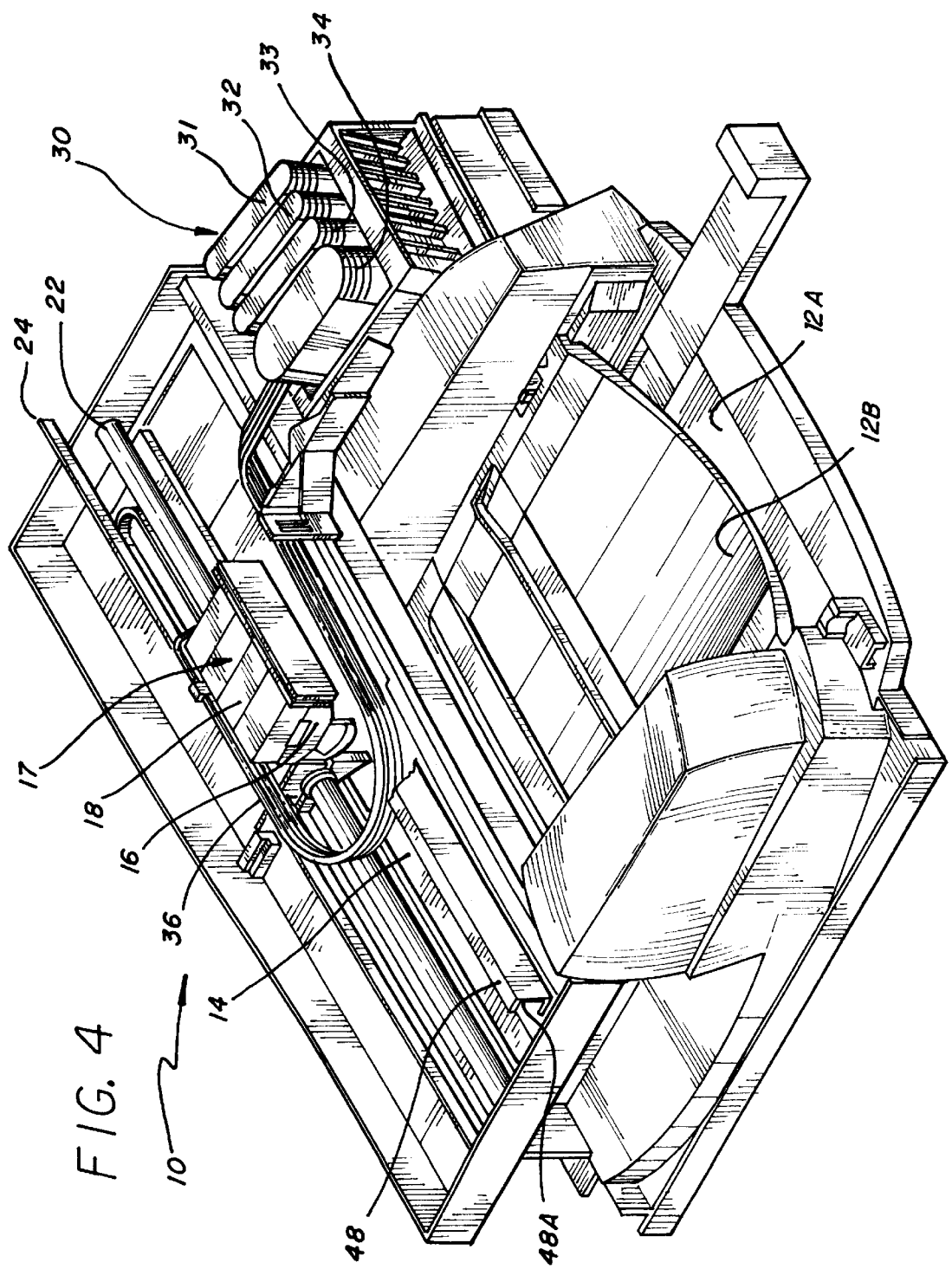
FIG. 4 is an isometric view of a printer in which preferred embodiments of the invention operate—the printer cover being removed to show interior features.

Our invention is advantageously incorporated into the operation of an inkjet printer 10 (FIG. 4). The printer may be one which uses inkjet printheads having integral ink reservoirs that are carried with the printheads along a carriage-scan axis, or as shown may instead be an "off axis" type—meaning that ink is instead in a stationary external supply 30.

Figure 7:
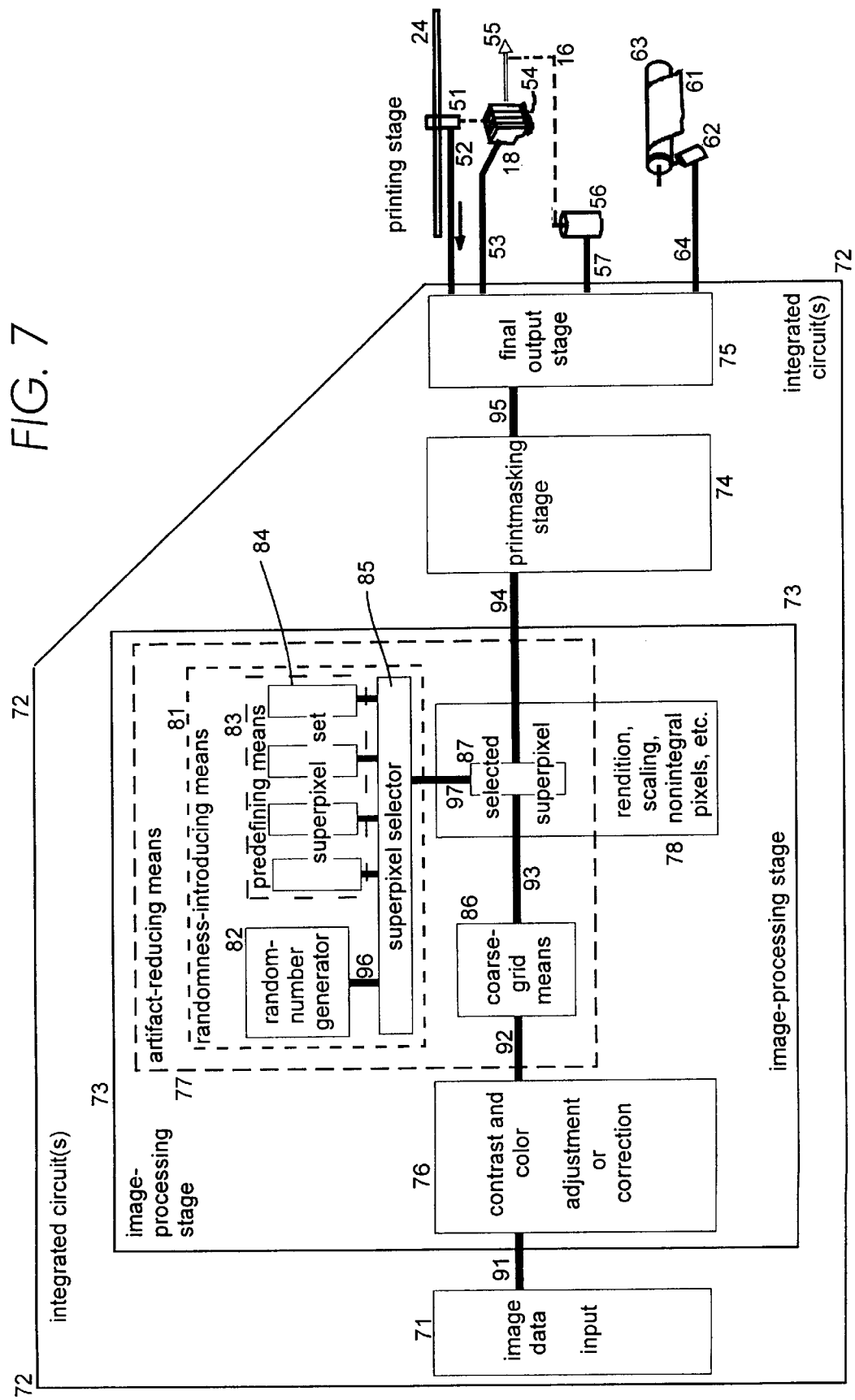
FIG. 7 is a highly schematic block-diagrammatic representation of preferred embodiments of the invention.

Generally the printer includes a tray 12A for holding a supply of fresh paper or other printing medium. To begin the printing process, a sheet feeder—modernly a conventional stepper motor and feed rollers, but for broad conceptual purposes symbolized by a classical cylindrical platen 63 (FIG. 7)—advances a sheet 61 of printing medium from the tray into the printer proper. Here the print medium traverses a U-shaped path to travel in the opposite direction—i. e., toward the output tray 12B.

Along the way the sheet stops with a particular portion of the sheet in a printzone 14. While the sheet is in that position, a scanning carriage 16 (in the conceptual drawing represented by a dashed line) carries 55 one or more printheads 18 across the sheet—ejecting ink-drops 54 to print a swath of ink spots on the sheet.

Preferably the printer actually employs a planar rather than a cylindrical platen at the printzone 14 for supporting the print medium very precisely but also economically. In any event a stepping motor 62, controlled by electronic drive signals 64, advances the print medium.

After a single scan or multiple scans, the sheet 16 is then incrementally shifted to a next position, with another portion of the sheet in the printzone 14. The carriage 16 again scans 55 across the sheet for printing another swath of ink.

These operations iterate until printing is complete, whereupon the sheet is forwarded to a position above tray 12B. This freshly printed sheet is held in that position for a time, to allow for drying of any previously ejected sheet already in the tray 12B, and then released.

The carriage 16 scanning mechanism may be conventional and generally includes a sliderod 22, along which the carriage 16 slides. The mechanism also includes a flexible circuit (not shown) for transmitting electrical signals from the microprocessor in the printer to the carriage 16 and printheads 18.

A photodetector 51 in the carriage 16 optically detects a codestrip 24 to develop position and speed signals 52 for use in precisely positioning the carriage 16 and servocontrolling its scan velocity. Electronic drive signals 57 operate a stepper motor 56, connected to the carriage 16 using a conventional drive belt and pulleys, to drive the carriage 16 across the printzone 14.

An ink delivery system provides ink to the printheads 18, and ultimately to the ink ejection chambers in the printheads, from an off-axis ink supply station 30. The station contains replaceable cartridges 31–34, which contain ink—either pressurized or at atmospheric pressure.

Color printers typically include separate replaceable ink supply cartridges 31–34 for black, yellow, magenta and cyan ink respectively. An ink supply station 30 holds these "off axis" cartridges, and four tubes 36 carry ink from the respective cartridges 31–34 to their corresponding printheads 18.

Figure 5:
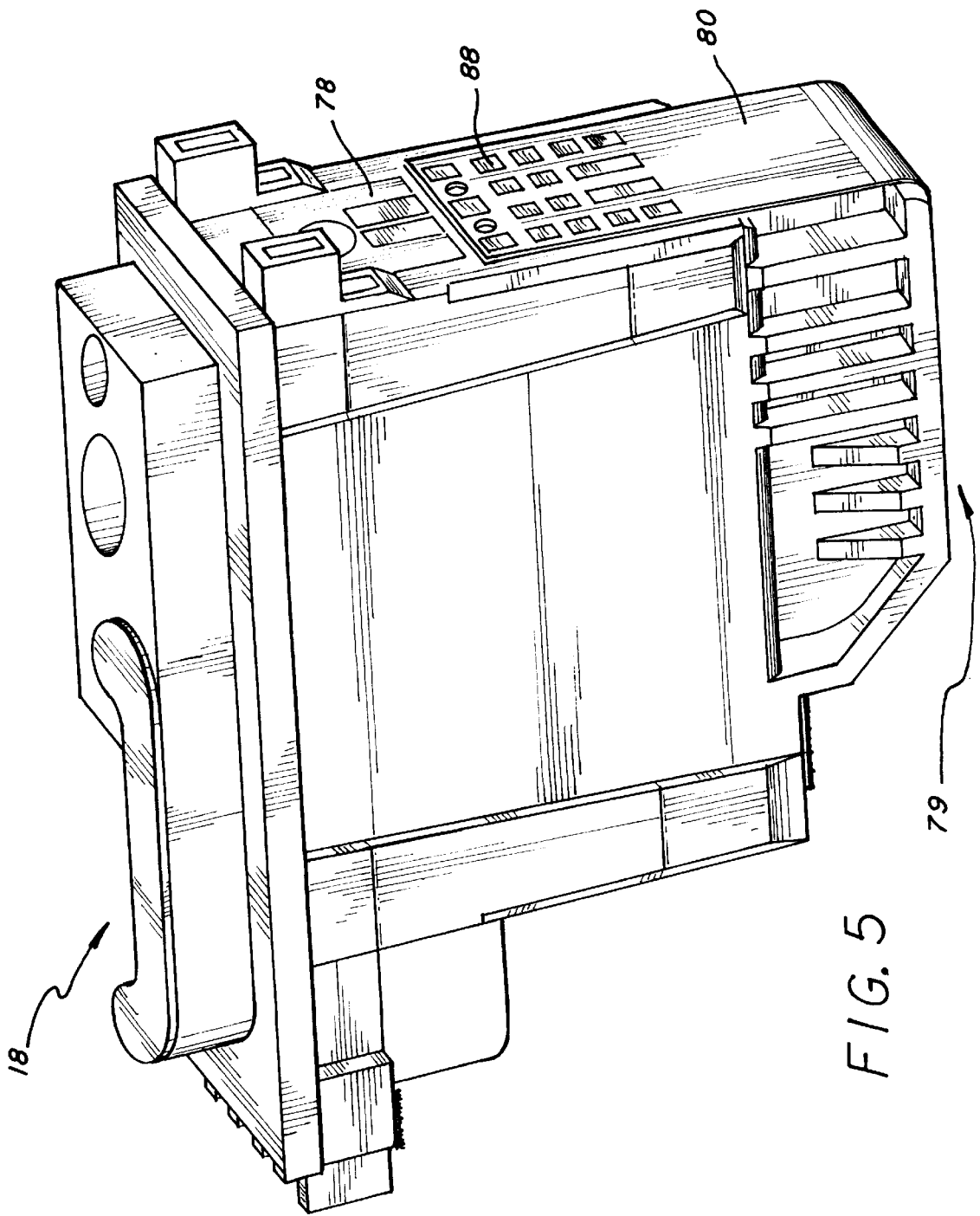
FIG. 5 is a like view, taken from left-front and above, of an inkjet printhead for use in the same printer.
Figure 6:
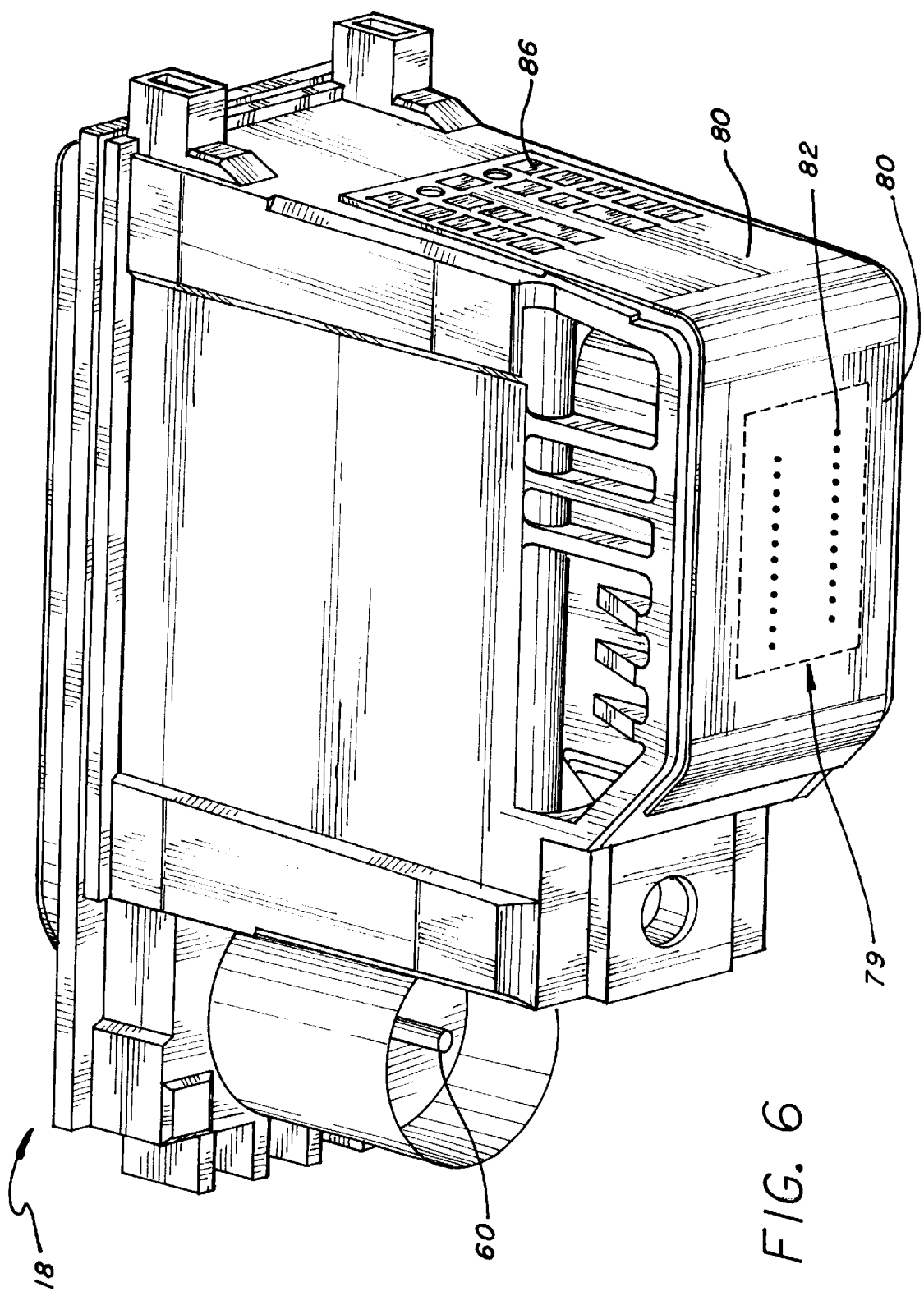
FIG. 6 is a like view of the same printhead taken from left-front and below.

Secured to each of the four printheads 18 is a flexible tape 80 (FIGS. 5 and 6), containing contact pads 86 that lead to respective electrodes (not shown) on the printhead substrate 88. The contact pads 86 align with and electrically contact electrodes (not shown) on the carriage 16.

An integrated-circuit chip or memory element 78 on each printhead 18 provides feedback to the printer regarding certain parameters such as nozzle trajectories and drop volumes of that particular printhead 18. Defined through the tape 80 by laser ablation is a nozzle array or nozzle member 79, consisting of two rows of nozzles 82.

Ink from an ink chamber (not shown) passes through an ink fill hole 81 to initially fill an ink chamber in each printhead 18. After that initial filling a stopper (not shown) permanently seals the hole 81.

Within each printhead 18, a regulator valve (not shown) stabilizes pressure by opening and closing an inlet orifice to the internal ink chamber. When the regulator valve is open, a hollow needle 60 provides fluid communication between the internal chamber and the corresponding one of the off-axis ink cartridges 31–34. During operation in the printer 10, the heads 18 are thus connected with the supply cartridges 31–34 for ink replenishment.

Printout of an image on the printing medium requires highly coordinated operation of the print-medium drive motor 62, carriage motor 56, position sensor 51 and printhead 18 nozzles. This coordinated operation is provided by one or more integrated-circuit chips 72, typically a digital electronic microprocessor or an application-specific integrated circuit, or both—mounted in the printer 10 and functionally interconnected with the several components mentioned.

The integrated circuit or circuits 72 are programmed in such a way as to provide functional blocks that include an image-processing stage 73. The circuits in some printers also include a rendition or printmasking stage 74, which receives image data 71 after modification in the image-processing stage 73 and further manipulates those data in preparation for use in printing. A final interface stage 75 may introduce color-space adjustments or other signal refinements before generating control signals 53, 57, 64 (and receiving the codestrip data 52).

The image-processing stage 73 typically includes front-end modules 76 that receive 91 the input data 71, and automatically adjust contrast and (in a color printer) color balance—or introduce color-space conversions. The front-end modules 76 may also enable manual entry of user preferences in contrast or color.

Conventionally, signals thus modified proceed 92 to an intermediate rendition block 78 that determines spatial assignment of color dots to pixels. The primary purpose of this block is to approximate the very large number of colors in the image data 71 by a relatively much smaller number of levels and color combinations available in an economical printing stage 24–64.

As noted earlier, the same block 78 may introduce non-integral pixels, or may accommodate image scaling. Such conventional functions typically, though not always, include use of a superpixel (or dither cell) 87.

According to our invention, the rendition portion 78 of the image-processing stage is pressed into service for another function—namely artifact reduction. In essence a portion of the rendition module 78 is absorbed into an artifact-reducing block 77.

This block 77 includes means 81 for introducing randomness into operation of the rendition module 78. The point is to remove dot-placement errors inherent in operation of the mechanical and fluidic elements 24–64 of the printing stage.

If no superpixel 87 is already present, and if no image scaling is involved in the processing, a preliminary block 86 may be interposed to step down the image-data 71 resolution to a coarser-grid signal 93. Once the working signal 93 is at a coarser resolution than used in the masking, output and printing stages, the system is ready for operation of our new randomness-introduction block 81.

This block includes a portion 83 which predefines for each tonal level a set 84 of superpixels, rather than just one superpixel 87 as in the conventional system. The randomness block 81 also includes some form of random-number generator 82.

As previously mentioned, this unit 82 may be actually only a pseudorandom listing of previously selected numbers, though of course in a very irregular pattern. If such a list is sufficiently long and preferably somewhat decoupled from the masking stage 74 (if present), operation should be substantially indistinguishable from that which would be obtained using a truly random sequence.

The random-number generator 82 directs its series of numbers 96 to a superpixel selector 85, which for each pixel chooses a particular superpixel from the predefined set 84. Bit values from the chosen superpixel 97 proceed to the previously discussed rendition stage 78, for use in precisely the same way as the single superpixel 87 in conventional rendition.

Thus in the illustration we identify the superpixel 87 which is actually used in the rendition block as a "selected" superpixel. The output signals 94 of the image-processing stage 73 thus include a random component that is absent in the conventional system.

If a printmasking stage 74 is present, that stage further disrupts unwanted regularities of the inking process and thus cooperates with our invention to provide even more-irregular forms 95 of the data, for use in generating the printing control signals 53, 57, 64.

Figure 8:
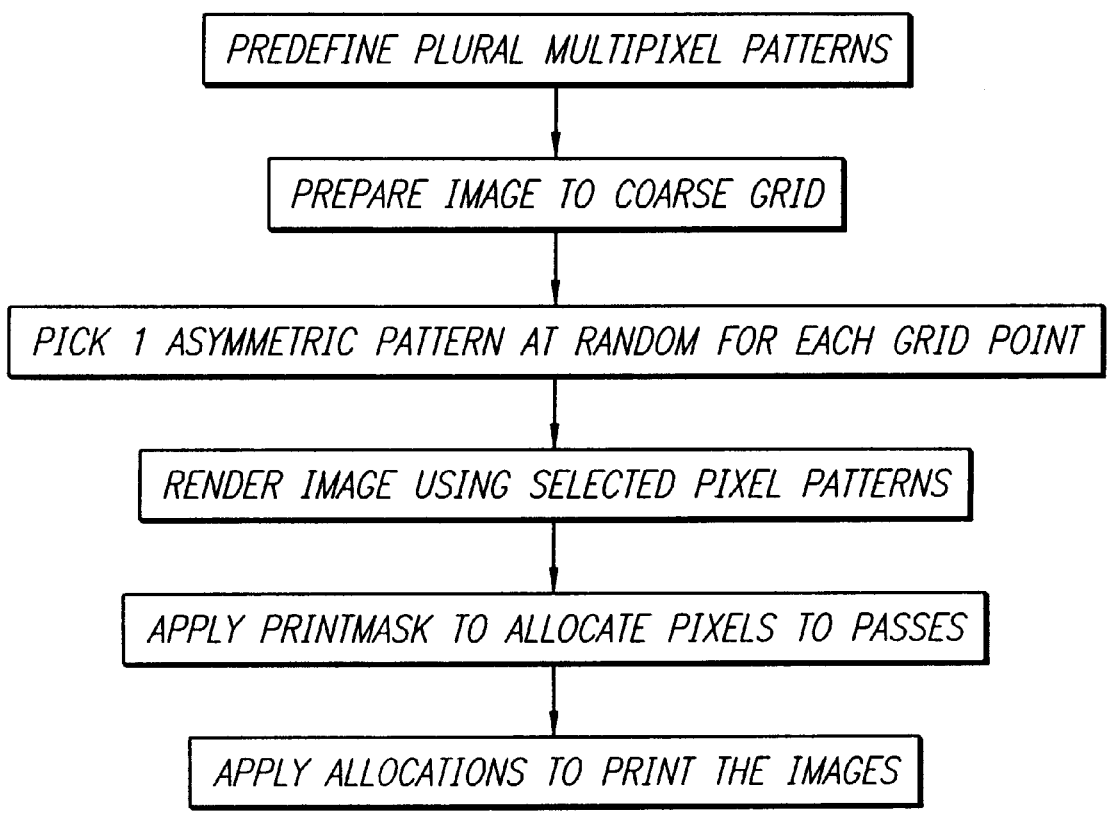
FIG. 8 is a flow chart showing operation of certain preferred embodiments.

Operation of our invention can also be conceptualized in system-flow terms as shown in FIG. 8. In view of the foregoing explanations, this flow chart will be self explanatory to those skilled in the art.

The above disclosure is intended as merely exemplary, and not to limit the scope of the invention—which is to be determined by reference to the appended claims.

What is claimed is:

1. Apparatus for printing desired images on a printing medium, by construction from individual marks formed in pixel arrays on a printing medium; said apparatus comprising:
    an image-processing stage for establishing spatial assignments of inking into pixels;
    means for reducing periodic inking artifacts;
    said reducing means comprising means for introducing randomness in the image-processing stage; and
    a printing stage for applying signals from the image-processing stage to control forming of the marks on such medium.

2. The apparatus of claim 1, wherein:
    the randomness-introducing means comprise means for selecting a superpixel, substantially at random, from among a plurality of superpixels usable at least at certain points in the image.

3. The apparatus of claim 2, wherein:
    the image-processing stage comprises means for receiving desired tonal levels for all points in the image; and
    the superpixel-selecting means comprise means for selecting a superpixel at least for said certain of said points which are associated with an intermediate tonal level.

4. The apparatus of claim 3, wherein:
    the printing stage comprises means defining an output resolution and marking means capable of multiple tonal values;
    the randomness-introducing means further comprise means for predefining, for at least each inking level in a midrange of the tonal values, a plurality of multipixel patterns at the printer resolution, for use as said plurality of superpixels.

5. The apparatus of claim 1, for use in forming said pixel arrays in sequential printing passes, and further comprising:
    a printmasking stage, which receives signals from and is distinct from the image-processing stage, and in response establishes temporal assignments of said inking into the plural printing passes; and wherein:
        the reducing means comprise means for reducing such artifacts that are associated with repetitively used printmasking patterns; and
        the printing stage applies the new signals from the printmasking stage to control said mark forming.

6. The apparatus of claim 5, wherein:
    the randomness-introducing means comprise means for selecting a superpixel, substantially at random, from among a plurality of superpixels usable at least at certain points in the image.

7. The apparatus of claim 6, wherein:
    the image-processing stage comprises means for receiving desired tonal levels for all points in the image; and
    the superpixel-selecting means comprise means for selecting a superpixel at least for said certain of said points which are associated with an intermediate tonal level.

8. The apparatus of claim 7, wherein:
    the printing stage comprises means defining an output resolution and marking means capable of multiple tonal values;
    the randomness-introducing means further comprise means for predefining, for at least each inking level in a midrange of the tonal values, a plurality of multipixel patterns at the printer resolution, for use as said plurality of superpixels.

9. Apparatus for printing desired images on a printing medium, by construction from individual marks formed in pixel arrays on a printing medium; said apparatus comprising:
    an image-processing stage for establishing spatial assignments of inking into pixels;
    means for reducing periodic inking artifacts;
    said reducing means comprising means for introducing randomness in the image-processing stage; and
    a printing stage for applying signals from the image-processing stage to control forming of the marks on such medium; and wherein:

the randomness-introducing means comprise means for selecting a superpixel, substantially at random, from among a plurality of superpixels usable at least at certain points in the image;

the image-processing stage comprises means for receiving desired tonal levels for all points in the image;

the superpixel-selecting means comprise means for selecting a superpixel at least for said certain of said points which are associated with an intermediate tonal level;

the printing stage comprises means defining an output resolution and marking means capable of multiple tonal values; and the randomness-introducing means further comprise:
means for predefining, for at least each inking level in a midrange of the tonal values, a plurality of multipixel patterns at the printer resolution, for use as said plurality of superpixels;

means for preparing the image using a pixel grid that is coarser than the available printer resolution; and means for selecting, for each point in the coarser grid, one respective pixel pattern from the plurality of patterns.

10. Apparatus for printing desired images on a printing medium, by construction from individual marks formed in pixel arrays on a printing medium, in sequential plural printing passes; said apparatus comprising:

an image-processing stage for establishing spatial assignments of inking into pixels;

means for reducing periodic inking artifacts;

said reducing means comprising means for introducing randomness in the image-processing stage;

a printing stare for applying signals from the image-processing stage to control forming of the marks on such medium;

a printmasking stage, which receives signals from and is distinct from the image-processing stage, and in response establishes temporal assignments of said inking into the plural printing passes; and wherein:

the reducing means comprise means for reducing such artifacts that are associated with repetitively used printmasking patterns; and the printing stage applies the new signals from the printmasking stage to control said mark forming; and wherein:

the randomness-introducing means comprise means for selecting a superpixel, substantially at random, from among a plurality of superpixels usable at least at certain points in the image;

the image-processing stage comprises means for receiving desired tonal levels for all points in the image; and the superpixel-selecting means comprise means for selecting a superpixel at least for said certain of said points which are associated with an intermediate tonal level;

the printing stage comprises means defining an output resolution and marking means capable of multiple tonal values; and the randomness-introducing means further comprise:
means for predefining, for at least each inking level in a midrange of the tonal values, a plurality of multipixel patterns at the printer resolution, for use as said plurality of superpixels;

means for preparing the image using a pixel grid that is coarser than the available printer resolution; and means for selecting, for each point in the coarser grid, one respective pixel pattern from the plurality of patterns.

11. The apparatus of claim 10, wherein the randomness-introducing means further comprise:

means for rendering the image using the selected printer-resolution pixel patterns at each point in the coarser grid; and means for then applying at least one printmask to allocate pixels of the rendered image as among the multiple printer passes.

12. The apparatus of claim 11, wherein the selecting means comprise:

means for selecting at random only among certain of the plurality of patterns that is asymmetric.

13. Apparatus for printing desired images on a printing medium, by construction from individual marks formed in pixel arrays on a printing medium; said apparatus comprising:

an image-processing stage for establishing spatial assignments of inking into pixels;

means for reducing periodic inking artifacts;

said reducing means comprising means for introducing randomness in the image-processing stage; and a printing stage for applying signals from the image-processing stage to control forming of the marks on such medium; wherein the randomness-introducing means comprise:

means for preparing the image using a pixel grid that is coarser than the available printer resolution; and means for selecting, for each point in the coarser grid, one respective pixel pattern from a plurality of patterns usable at that point.

14. The apparatus of claim 13, wherein:

the randomness-introducing means further comprise means for rendering the image using the selected printer-resolution pixel patterns at each point in the coarser grid.

15. Apparatus for printing desired images on a printing medium, by construction from individual marks formed in pixel arrays; said apparatus comprising:

an image-processing stage for establishing spatial assignments of inking into pixels;

means for establishing multiple selectable superpixels for use in the image-processing stage; and means for substantially randomly selecting superpixels, from among said multiple selectable superpixels, for use in the pixel array.

16. The apparatus of claim 15, further comprising:

a printmasking stage, which follows and is distinct from the image-processing stage, for establishing temporal assignments of said inking into plural printing passes.

17. A method of printing desired images on a printing medium, using a printer that has a printer resolution and is capable of multiple tonal values, and that operates by construction from individual marks formed in pixel arrays in multiple inking passes; said method comprising the steps of:

predefining, for at least each inking level in a midrange of the tonal values, a plurality of multipixel patterns at the printer resolution;

preparing the image using a pixel grid that is coarser than the available printer resolution;

for each point in the coarser grid, selecting one respective pixel pattern from the plurality of patterns;

rendering the image using the selected printer-resolution pixel patterns at each point in the coarser grid; and then applying at least one printmask to allocate pixels of the rendered image as among the multiple printer passes.

18. The method of claim 17, wherein the selecting step comprises:

selecting the one pattern from the plurality of patterns substantially at random.

19. The method of claim 18, wherein the random-selecting step comprises:

selecting at random only among certain of the plurality of patterns that is asymmetric.

20. The method of claim 19, wherein the random-selecting step comprises:

selecting at random among at least certain of the plurality of patterns that are initially either symmetric or asymmetric.

* * * * *